US011313793B2

(12) United States Patent
Bertacco et al.

(10) Patent No.: US 11,313,793 B2
(45) Date of Patent: Apr. 26, 2022

(54) OPTO-MAGNETIC SENSOR DEVICE AND MOLECULAR RECOGNITION SYSTEM

(71) Applicant: Politecnico di Milano, Milan (IT)

(72) Inventors: Riccardo Bertacco, Milan (IT); Andrea Ivano Melloni, Milan (IT); Parikshit Pratim Sharma, Milan (IT); Nicola Peserico, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 16/772,540

(22) PCT Filed: Dec. 14, 2018

(86) PCT No.: PCT/IB2018/060095
§ 371 (c)(1),
(2) Date: Jun. 12, 2020

(87) PCT Pub. No.: WO2019/116337
PCT Pub. Date: Jun. 20, 2019

(65) Prior Publication Data
US 2020/0386680 A1 Dec. 10, 2020

(30) Foreign Application Priority Data
Dec. 15, 2017 (IT) .................. 102017000145130

(51) Int. Cl.
*G01N 21/41* (2006.01)
*G01N 21/17* (2006.01)
(52) U.S. Cl.
CPC ......... *G01N 21/41* (2013.01); *G01N 21/1717* (2013.01); *G01N 2021/1727* (2013.01)

(58) Field of Classification Search
CPC .... G01N 21/03; G01N 21/255; G01N 21/648; G01N 27/3278; G01N 33/50;
(Continued)

(56) References Cited

U.S. PATENT DOCUMENTS

2006/0268408 A1* 11/2006 Toussaint, Jr. ........ G02B 27/286
359/489.07
2013/0214040 A1* 8/2013 Beerling ................ G01D 18/00
235/375
(Continued)

FOREIGN PATENT DOCUMENTS

JP 2005524052 A * 8/2005
WO WO-2005111619 A1 * 11/2005 ........... G01N 33/587
WO WO-2008072156 A2 * 6/2008 ........... G01N 21/552

*Primary Examiner* — Michael P Stafira
(74) *Attorney, Agent, or Firm* — Mark Malek; Widerman Malek, PL

(57) ABSTRACT

An opto-magnetic device includes an integrated optical circuit having an input for an input optical radiation and at least one output for an output optical radiation. The optical circuit defines an area sensible to the variations of a local refraction index probed by the optical radiation, destined to come in contact with the sample. A plurality of probe molecules are included to anchor to the sensible area, and a plurality of magnetic particles are included to anchor to molecules of the analyte, bound to the probe molecules upon a molecular recognition. A magnetic actuator is configured to generate a variable magnetic field and oscillate the magnetic particles to cause variation of the refraction index probed by the optical radiation in the sensible area, and a variation of at least one characteristic parameter of the output optical radiation correlated to a concentration of the molecules of the analyte.

15 Claims, 9 Drawing Sheets

(58) Field of Classification Search
CPC ........... G01N 33/5438; G01N 33/5695; G01N 33/56983; G01N 33/585; G01N 33/6845; G01N 1/28; G01N 15/0227; G01N 15/1456; G01N 15/1475; G01N 2015/003; G01N 2333/40; G01N 2333/916; G01N 2333/96425; G01N 2440/14; G01N 2440/30; G01N 27/44756; G01N 27/84; G01N 33/536; G01N 33/542; G01N 33/573; G01N 33/57407; G01N 33/70; G01N 1/00; G01N 11/16; G01N 15/10; G01N 19/04; G01N 2015/1497; G01N 2021/4707; G01N 2021/4709; G01N 2021/4726; G01N 21/23; G01N 21/45; G01N 21/552; G01N 21/553; G01N 2291/0255; G01N 2291/02827; G01N 2333/005; G01N 2333/20; G01N 24/081; G01N 24/087; G01N 2446/84; G01N 2446/90; G01N 2469/00; G01N 27/02; G01N 27/023; G01N 33/581; G01N 33/78; G01N 33/80; G01N 35/085; G01N 1/30; G01N 15/0612; G01N 2015/03; G01N 2015/144; G01N 2015/1445; G01N 2015/1452; G01N 2015/1454; G01N 2021/1706; G01N 2021/1721; G01N 2021/435; G01N 2035/00158; G01N 2035/00435; G01N 2035/0441; G01N 21/1702; G01N 21/274; G01N 21/643; G01N 22/00; G01N 2201/06113; G01N 2201/0691; G01N 2291/02466; G01N 2291/02475; G01N 2333/7051; G01N 2333/70539; G01N 2446/30; G01N 2446/86; G01N 27/041; G01N 27/3276; G01N 2800/00; G01N 2800/323; G01N 29/2418; G01N 33/04; G01N 33/14; G01N 33/487; G01N 33/48728; G01N 33/49; G01N 33/5002; G01N 33/505; G01N 33/525; G01N 33/5308; G01N 33/531; G01N 33/533; G01N 33/54353; G01N 33/545; G01N 33/6893; G01N 35/00069; G02B 1/04; G02B 5/206; G02B 5/208; G02B 5/3025; G02B 2006/12121; G02B 2006/12123; G02B 6/12002; G02B 6/1223; G02B 6/1228; G02B 6/125; G02B 6/132; G02B 6/134; G02B 6/136; G02B 6/14; G02B 6/2821; G02B 6/29332; G02B 6/305; G02B 27/017; G02B 3/0062; G02B 30/24; G02B 30/27; G02B 1/111; G02B 13/22; G02B 13/24; G02B 17/008; G02B 17/08; G02B 17/0812; G02B 3/0068; G02B 27/286; G02B 27/30; G02B 5/0226; G02B 6/12007; G02B 6/29341; G02B 6/29395; G02B 1/007; G02B 1/045; G02B 1/14; G02B 13/0085; G02B 2006/12069; G02B 2006/1219; G02B 26/026; G02B 27/0018; G02B 27/10; G02B 3/0012; G02B 3/0056; G02B 5/003; G02B 5/0242; G02B 5/0268; G02B 5/3058; G02B 6/00; G02B 6/12004; G02B 6/1221; G02B 6/138; G02B 6/2552; G02B 7/008

See application file for complete search history.

(56) References Cited

U.S. PATENT DOCUMENTS

| | | | |
|---|---|---|---|
| 2013/0261010 A1* | 10/2013 | Bailey | G01N 27/72 506/9 |
| 2014/0241590 A1* | 8/2014 | Day, Jr. | G06T 7/62 382/110 |
| 2019/0038190 A1* | 2/2019 | Zhong | A61B 5/14517 |
| 2019/0338341 A1* | 11/2019 | Gusiatnikov | C12Q 1/686 |

* cited by examiner

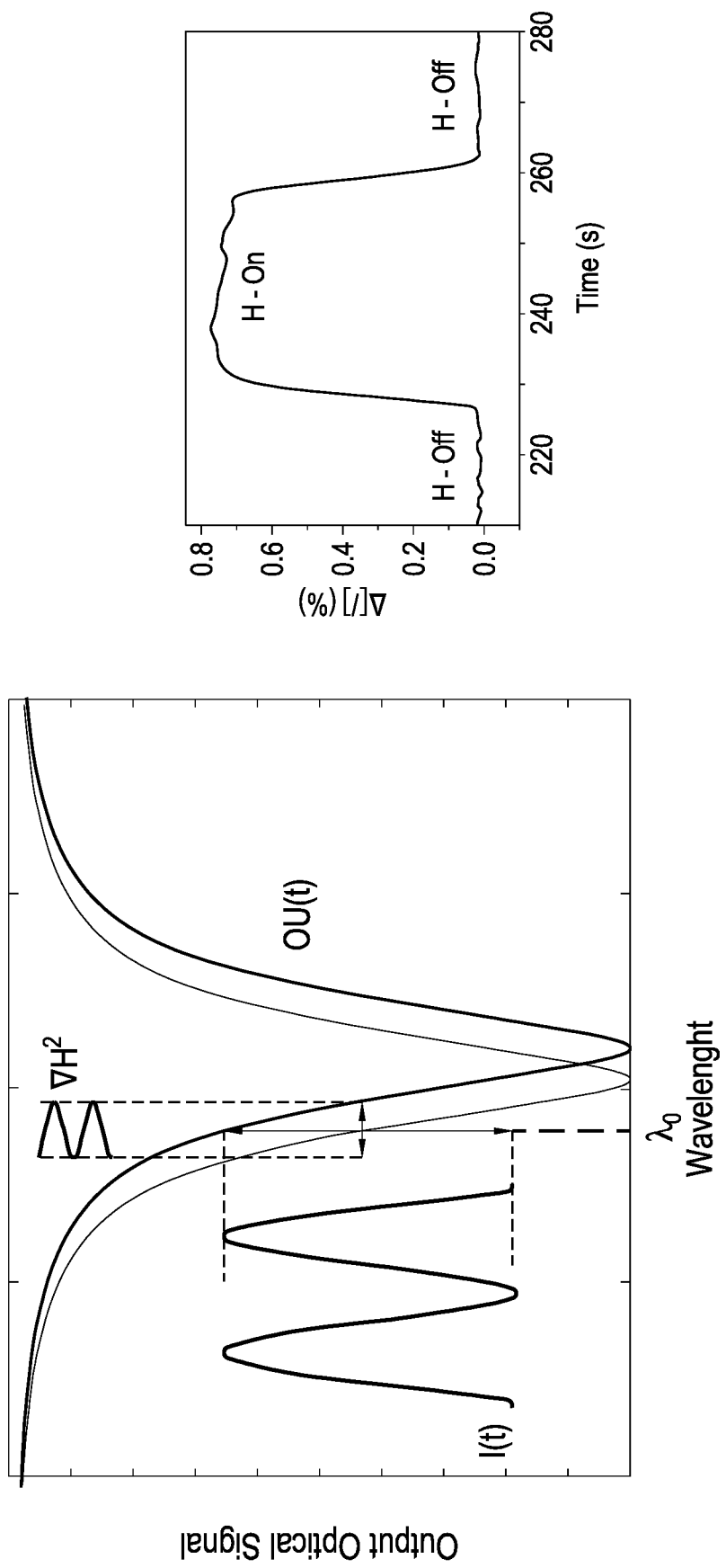

OPTO-MAGNETIC SENSOR DEVICE AND MOLECULAR RECOGNITION SYSTEM

RELATED APPLICATIONS

This application is a national phase application of and claims priority under 35 U.S.C. § 371 of PCT Application Serial No. PCT/IB2018/060095 filed on Dec. 14, 2018 and titled OPTO-MAGNETIC SENSOR DEVICE AND MOLECULAR RECOGNITION SYSTEM. The content of this application is incorporated herein by reference.

FIELD OF THE INVENTION

The present invention refers to the field of sensing the presence and concentration of an analyte in a sample by means of an optical sensor.

BACKGROUND OF THE INVENTION

According to a known technique, it is used a chip provided with optical sensors suitably functionalized to the surface thereof by probe molecules which specifically bind to analyte molecules in a molecular recognition process, for sensing the presence and concentration of said analyte molecules in a sample. Said sensing is made possible by varying the optical characteristics, generally the refraction index, upon a chemisorption of the analyte molecules on the sensor surface due to the hybridization with the probes, which causes a response optical change of the sensor itself. If the sensor is a ring optical resonator, the variation of the refraction index causes a measurable shift of the resonance, which is assumed as an indicator of the locally captured quantity of analyte molecules.

The use of microresonators is for example described in the document: "Label-Free Single Exosome Detection Using Frequency-Locked Microtoroid Optical Resonators", Judith Su, ACS Photonics 2015, 2, 1241-1245. The signal useful for having the analyte concentration is obtained by measuring the shift of the resonance wavelength upon the molecular recognition and consequently requires that, during said measure, there are not spurious phenomena causing a shift of the resonance uncorrelated to the molecular recognition and therefore causing false positives. Such spurious phenomena can be tied to temperature variations, a partial evaporation of the sample on the optical chip, variations of the optical coupling, mechanical instabilities, etcetera. From the operative point of view, this requires to provide several experimental provisions minimizing the spurious effects: stabilization of the temperature, use of a suitable microfluid cell preventing the evaporation, assembly on an antivibration optical table, the addition of further control sensor elements, etcetera. Moreover, it is necessary to acquire the signals during all the molecular recognition process, this step often requires more than 30 minutes, in order to find possible spurious variations which could make invalid the result. This makes the test burdensome in terms of the required instrumentation and less adapted to be used in the field, outside a specialized scientific laboratory, which instead is required in many applications.

Document US-A-2013/4101 A1 describes a biosensing platform by which magnetic nanoparticles which can selectively bind to the analyte, are dispensed. By acting on a magnetic static field, said particles are attracted to the chip surface, so that the interaction between the analyte and probes is promoted. Even though this technique makes faster the test and increases the sensibility of the sensor due to the particle size greater than the analyte, it suffers from the beforehand described spurious phenomena.

Document US-A-2016/0146798 describes an optical biosensor based on the optical measure, in light transmission, of the variation of the Brownian relaxing times of magnetic particles freely moving in a suspension, upon a molecular recognition on the surface thereof. The Applicant observes that such method has some limitations about the use of the optical biosensor for the parallel recognition of different analytes, substantially due to the requirement of having different classes of particles, one for each analyte, specifically functionalized and having a frequency response well defined to oscillating magnetic fields used for exciting them.

SUMMARY OF THE INVENTION

The present invention addresses the problem of proposing a molecular recognition technique based on an optical sensor, enabling to reduce the effect of spurious phenomena (temperature variations, partial evaporation of the sample, optical coupling variations, mechanical instabilities, for example) in comparison with the known prior art.

Particularly, the object of the present invention is an opto-magnetic device as defined in claim 1, and the preferred embodiments thereof as defined in claims from 2 to 8.

It is also an object of the present invention an analyte recognition system as described in claim 9 and in the particular embodiments thereof defined in claims from 10 to 16.

BRIEF DESCRIPTION OF THE DRAWINGS

The present invention is specifically described in the following in a non-limiting exemplifying way, with reference to the attached drawings, wherein:

FIG. 7*a* and FIG. 7*b* show the variation of the intensity of the optical radiation at two different outputs of the optical sensor device subjected to an oscillating magnetic field in the presence of the molecular recognition and magnetic particles;

FIG. 9 shows the intensity variation of the output optical signal from the optical sensor device in the presence and without the magnetic field.

DETAILED DESCRIPTION OF THE INVENTION

Figure 1:
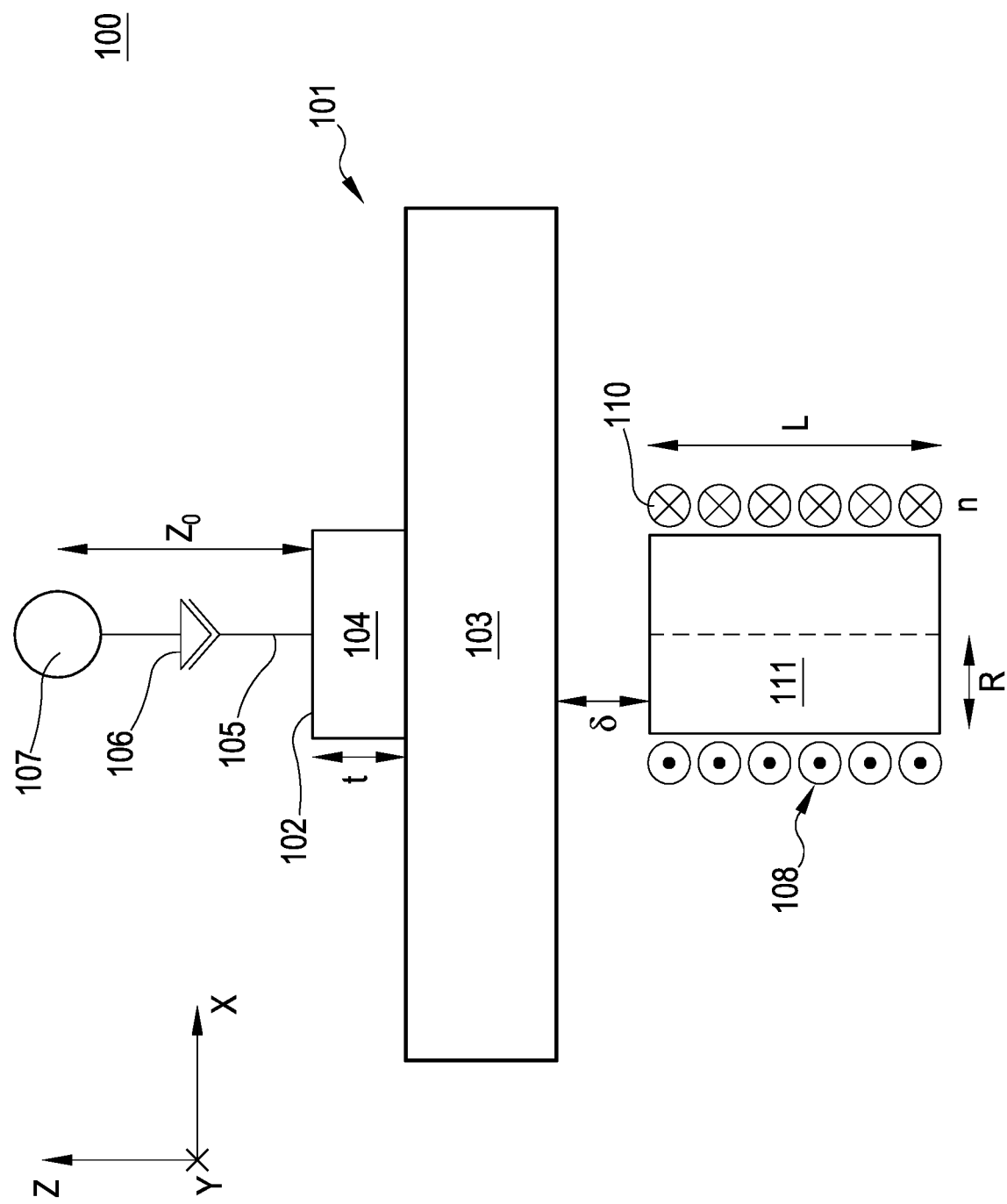
FIG. 1 schematically illustrates (by a cross-section) an example of an optical device for sensing the presence of an analyte, having a magnetic actuator.

While the invention is susceptible to different modifications and alternative constructions, some particular embodiments are shown in the drawings and will be specifically described in the following. In the present description, analogous or identical elements or components will be indicated in the figures by the same identifying symbol.

Figure 2:
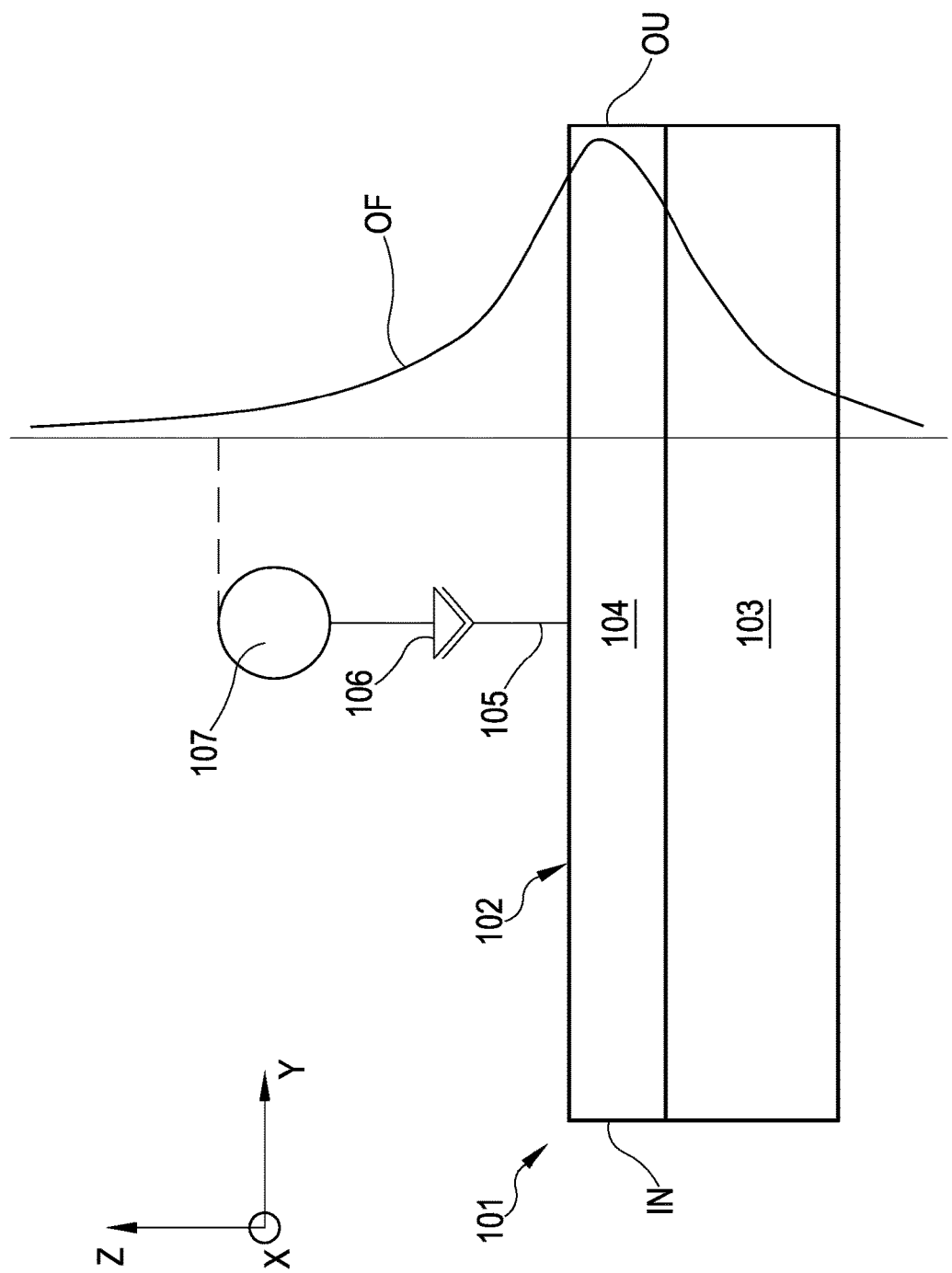
FIGS. 2 and 3 schematically illustrate the optical sensor device in an operative step.

FIG. 1 and FIG. 2 schematically show an example of an optical sensor device 100, sensible to the presence of an analyte. The optical sensor device 100 can sense the presence of different types of substances (analytes) such as for example: proteins, antibodies, nucleic acids, explosive and health harmful chemical substances, etcetera.

The optical sensor device 100 comprises an integrated optical circuit 101 having an input IN for an input optical radiation, and an output OU for an output optical radiation. The integrated optical circuit 101 comprises at least one area 102 sensible to the variations of a local refraction index probed (or seen) by the optical radiation. Such area 102 determines a surface adapted to immobilize the probe molecules, as will be described in the following.

Advantageously, the optical sensor device 100 is associated to a suitable dispensing system adapted to dispense a sample to be analyzed, containing the analyte, at least on the surface of the area 102 of the optical device itself, for example in a solution. Such dispensing system is also adapted to dispense other reagents necessary to perform a diagnostic test, among them suitable suspensions of magnetic particles, and also possible washings. If the sample is in a liquid phase, said dispensing system can consist of a microfluidic cell connected to a suitable apparatus provided with pumps and valves for managing the flows of the reagents on the optical device 100. In suitable embodiments of the diagnostic test, which do not require multiple washings or recognitions of the "sandwich" type, the dispensing system can comprise a well for receiving the sample.

In the example of FIGS. 1 and 2, the integrated optical circuit 101 is a planar optical waveguide (for example of the rib, ridge, slot, strip type or similar) and comprises a substrate 103 and a guiding layer 104 of the rectangular type for example, integrated on the substrate 103.

Specifically, an upper wall of the guiding layer 104 is the surface of the area 102 and on which the sample is destined to be placed in contact.

For example, the planar waveguide 101 is made by one of the following technologies: silicon photonics, silicon nitride, silicon oxynitride, indium phosphide, chalcogenides.

The optical sensor device 100, in an operative step, comprises a plurality of probe molecules 105 capable of anchoring to the surface of the area 102 of the optical circuit 101 and exhibiting a selective affinity to an analyte 106. The selection of the type of probe molecules 105 to be used depends on the type of analyte 106 of which the presence is expected to be sensed. Examples of substances useable as probe molecules 105 are: proteins, antibodies, nucleic acids, etcetera.

Moreover, the optical sensor device 100 is provided with a plurality of magnetic particles 107 capable of binding (anchoring) to the molecules 106 of the analyte. Such bond can be obtained during a step of preparing the sample, before a dispending step on the surface of the optical sensor device 100, or directly on the surface of the area 102 of the same, after the hybridization step between the probe molecules 105 and analyte 106. It is observed that the length of the probe molecule 105 is selected in order to obtain a good mobility of the magnetic particle 107 anchored to it by the analyte molecule 106.

Such magnetic particles 107 can be of the ferromagnetic, ferrimagnetic or paramagnetic type. Preferably, they are superparamagnetic particles. The superparamagnetic particles are the preferred ones because they avoid an undesired aggregation to each other while ensuring a substantial susceptibility.

Exemplary useable magnetic particles 107 comprise: single superparamagnetic nanoparticles (Co, CoFe, NiFe, ferrites $Fe_xO_y$, etc.), aggregates ("beads") of said superparamagnetic nanoparticles dispersed in a polymeric matrix, antiferromagnetic synthetic particles consisting of two ferromagnetic layers separated by a non-magnetic layer, having a thickness such to determine an antiparallel coupling of the magnetization in the two layers in a null field (Co/Cu/Co, CoFe/Ru/CoFe, CoPt/Ta/CoPt, etc.).

Particularly, the magnetic particles 107 in the nanometric range exhibit a diameter typically comprised from 50 to 250 nm. Greater dimensions must be avoided for limiting the disproportion between the linear dimensions of the probe-analyte complex after the molecular recognition at the surface and the dimensions of the magnetic particles 107. The purpose of this is also for limiting the high number of anchoring points of the single particle to the surface, in order to promote the motion thereof in response to external magnetic fields.

Moreover, said magnetic particles 107 can be advantageously designed for exhibiting a shape and magneto-crystalline anisotropy enabling a more effective mechanical implementation by time-varying magnetic fields.

The optical sensor device 100 is also provided with a magnetic actuator 108 (for example an electromagnet) configured to generate a variable magnetic field and move the magnetic particles 107, causing a variation of the refraction index of the optical circuit 101 and a variation of at least one characteristic parameter of the output radiation, correlated to a concentration of the analyte 106.

The magnetic actuator 108 can be arranged in different possible configurations with respect to the optical circuit 101. According to the example of FIG. 1, the electromagnet 108 faces a wall of the substrate 103 opposite to the one on which the area 102 sensible to the variation of the refraction index is placed. In FIG. 1, the magnetic actuator 108 is placed below the optical sensor device 100 but can be placed above, juxtaposed, or in other positions.

In the embodiment illustrated in FIG. 1, the electromagnet 108 comprises a magnetic core 111 and a solenoid conductor 110 (with n windings) for circulating an electric current. Other modes of generating variable magnetic fields can provide to move permanent magnets in proximity of the optical sensor device 101.

During the operation of the optical sensor device 100, a sample suspended in the analyte substance 106 is suitably disposed on the surface of the area 102 of the planar waveguide 101, sensible to the variations of the refraction index. In this case, the molecules 106 of the analyte specifically bind (by chemical bonds) to the probe molecules 105 (anchored to the area 102 of the guiding layer 104) and, then, the magnetic particles 107 bind to the molecules 106 of the analyte.

According to another possible mode, the sample placed on the surface of the area 102 of the guiding layer 104 is an analyte-particle complex comprising the molecules 106 of the analyte, already bound to the magnetic particles 107. According to this further mode, the already formed analyte-particle complex is specifically bound to the probe molecules 105.

Upon such bonds, and without a variable magnetic field, the magnetic particle 107 is disposed at a fixed distance $Z_0$ from the upper wall of the guiding layer 104, defined by the dimensions of the probes 105.

An optical radiation is injected in the input IN of the planar waveguide 101 and the optical mode thereof propagates along the direction y (indicated in Figures from 1 to 3).

Figure 3:
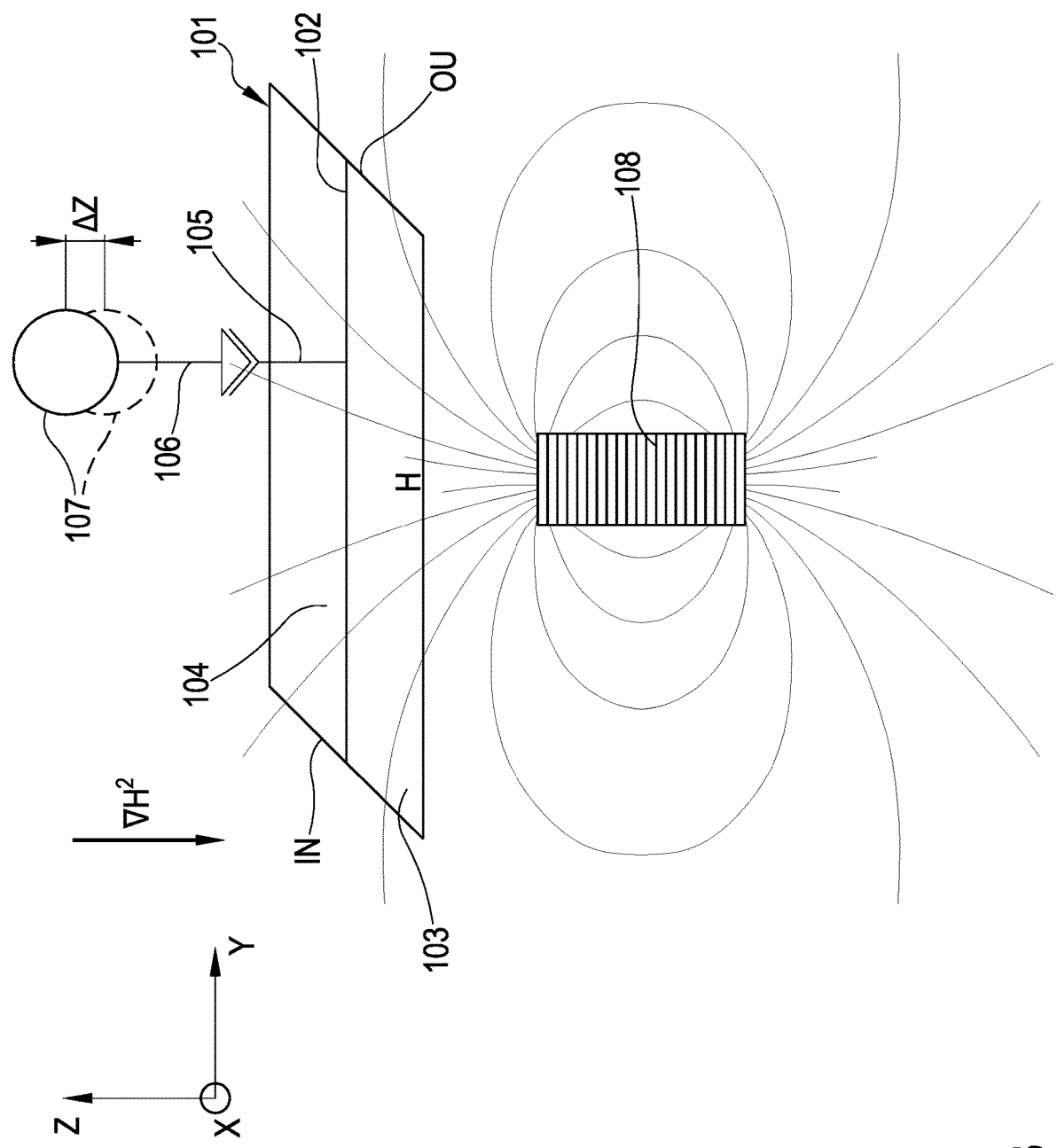

The magnetic actuator 108 is capable of producing a distribution of the magnetic field with a high gradient in a direction normal to the surface (axis z). FIG. 3 illustratively shows the lines of force of the magnetic field.

When the magnetic field is generated by the electromagnet 108, the magnetic particles 107 are in a gradient of the field and are subjected to a force directed towards the areas having a higher field (in other words towards the electromagnet 108 itself).

For magnetic particles 107 of the ferromagnetic type, the associated force is proportional to the gradient of the field $\nabla H$. By preferably using magnetic particles 107 of the superparamagnetic type, having a high susceptibility and a substantially null residual magnetism, in order to avoid the aggregation and anyway obtain high forces, the force exerted to the magnetic particle 107 is proportional to the gradient of the square of the magnetic field $\nabla H^2$. The magnetic particles 107 subjected to such force, therefore, tend to move along the axis z.

Figure 4:
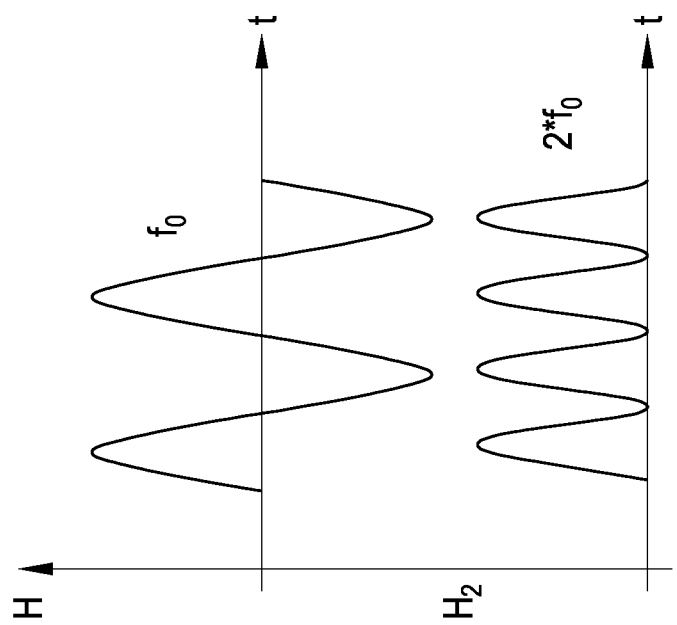
FIG. 4 illustratively shows the trend of the amplitude of the magnetic field and of the square of the magnetic field, generated by the magnetic actuator.

The described method of operation provides to generate, by the electromagnet 108, an oscillating field, causing a spatial oscillation of the magnetic particles 107 with a total amplitude $\Delta z$, shown in FIG. 3. Particularly, the electromagnet 108 generates a sinusoidal magnetic field modulated at frequency $f_0$. In this case, the frequency of the square $H^2$ of the field is twice, $2f_0$, as schematically shown in FIG. 4. It is also observed that the gradient of the square of the field, and therefore the force and displacement, are modulated at frequency $2f_0$. Since the force is a quantity defined as positive, in other words always directed towards the magnet 108, the magnetic particle 107 oscillates between an equilibrium position and one nearer to the electromagnet 108. Both such positions are also determined by biomechanical properties of the probe-analyte complex, by the gravity and by the Archimedes force, since the magnetic particle 107 is dispersed in the liquid of the sample.

The displacement of the magnetic particles 107 modifies the interaction with the optical radiation OF (or optical field) guided by the guiding layer 104 and shown in FIG. 2, causing a variation of the effective refraction index $n_{eff}$ probed by the evanescent electromagnetic field associated to the optical mode propagating in the wave guide optical circuit 101. The variation of the interaction between the magnetic particle 107 and electromagnetic field associated to the optical radiation, determines a change of at least one parameter of such optical radiation, such as for example the propagation losses, the propagation speed, the backreflections, with a time trend determined by the oscillating magnetic field produced by the electromagnet 108.

Therefore, sensing the changes of at least one parameter of the optical radiation caused by the oscillating magnetic field produced by the electromagnet 108 enables to obtain information regarding the concentration of the molecules 106 of the analyte in the used sample solution.

Figure 5:
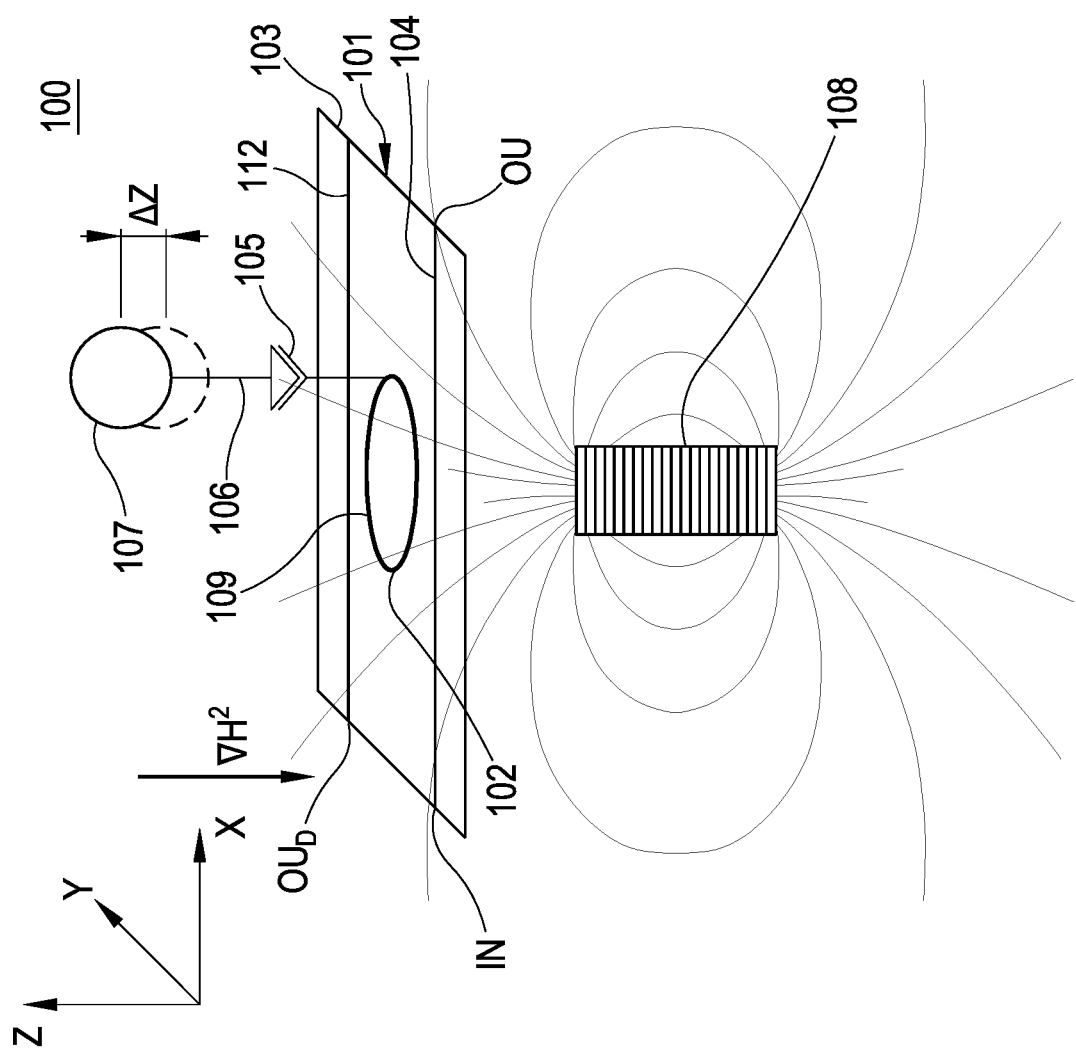
FIG. 5 schematically shows another embodiment of the optical sensor device.

It is observed that the optical circuit 101 can be also of a type different from the above described planar wave guide. For example, FIG. 5 schematically shows another version of the optical sensor device 100 wherein the optical circuit 101 comprises, in addition to the guiding layer 104 integrated in the substrate 103, also at least one optical microresonator 109. The optical microresonator 109 is optically coupled to the guiding layer 104 for receiving a portion of the optical radiation propagating in such guiding layer 104.

Moreover, the microresonator 109 is also coupled to a further planar optical guide 112, integrated on the substrate 103, having an additional output $OU_D$ for the optical radiation.

Figure 6A:
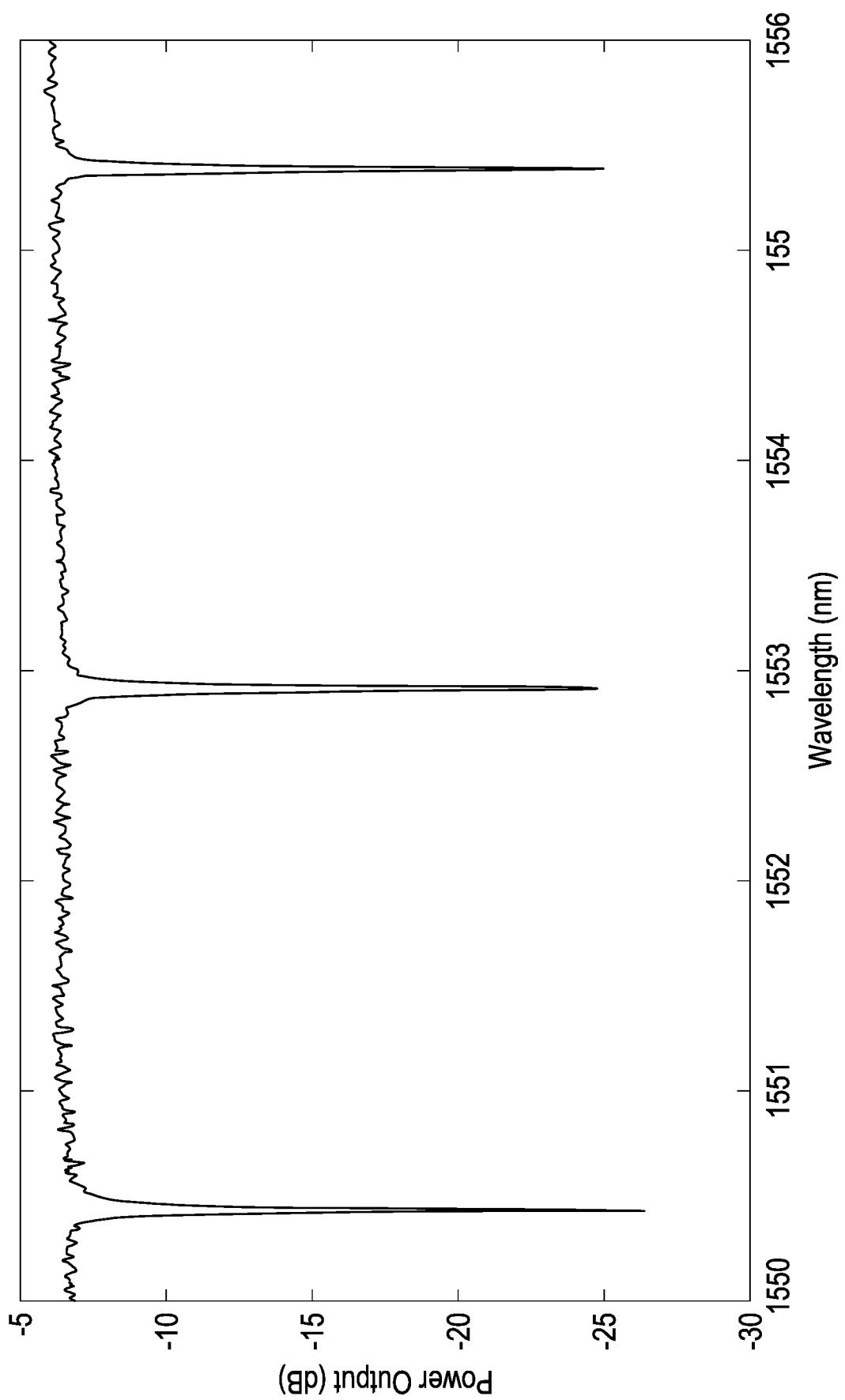
FIGS. 6*a* and 6*b* show the trend of the optical powers respectively at two different outputs of said sensor device as a function of the wavelength of the incident radiation.
Figure 6B:
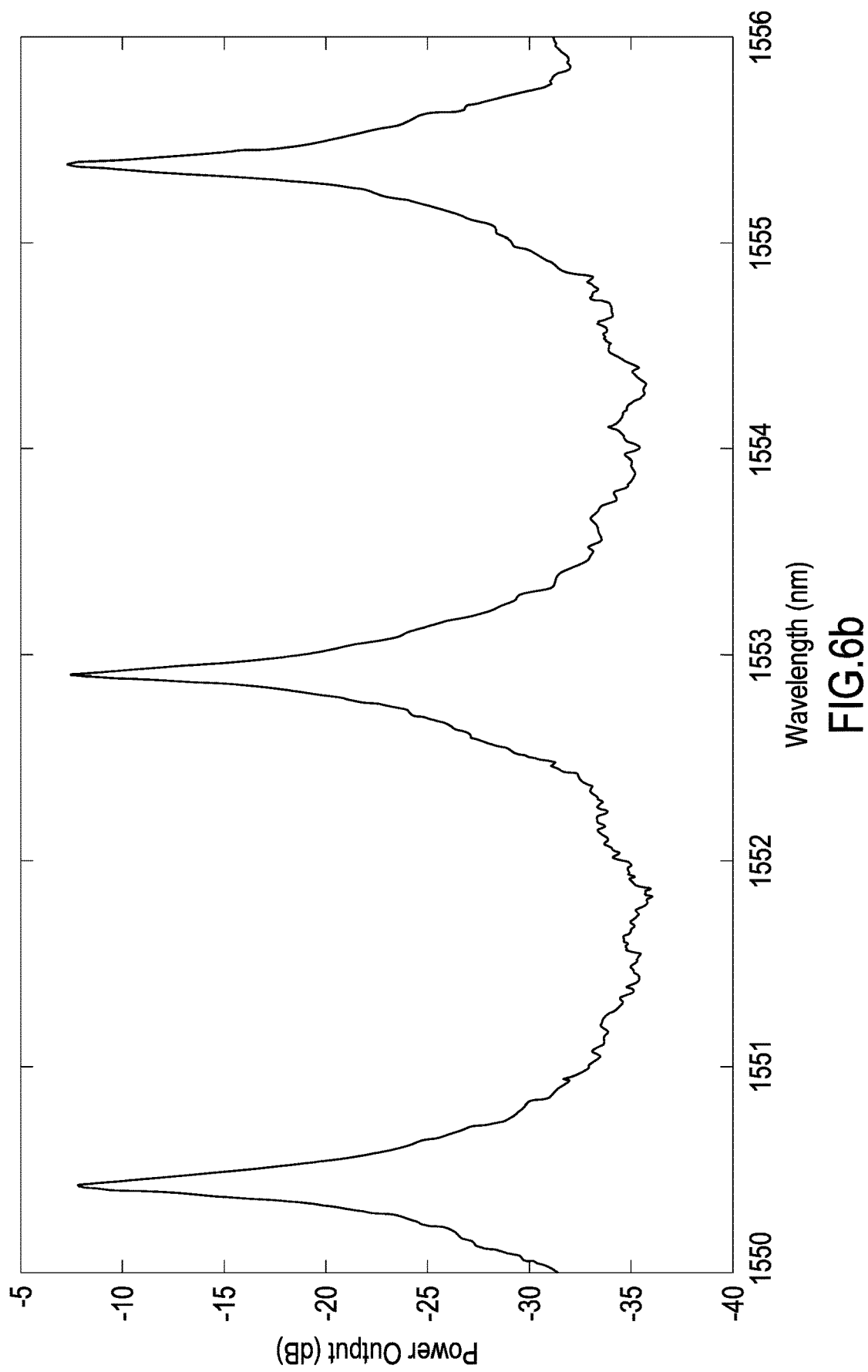

If the wavelength of the optical radiation injected in the optical circuit 101 is a submultiple of the optical path of the ring of the microresonator 109, the resonance condition is attained and the transmission of the guiding layer 104 towards the output OU is substantially decreased since is destined to the additional output $OU_D$. FIG. 6a illustratively shows the trend of the optical power at the output OU, sensed by a photodiode, as a function of the wavelength of the incident radiation. FIG. 6b shows the trend of the optical power at the additional output $OU_D$.

The oscillation of the magnetic particles 107 bound to the probe-analyte complex 105-106 on the surface of the area 102 of the resonator 109, causes a modification of the effective refraction index of the optical mode, causing a variation of the resonance frequency of the microresonator 109.

Figure 7B:
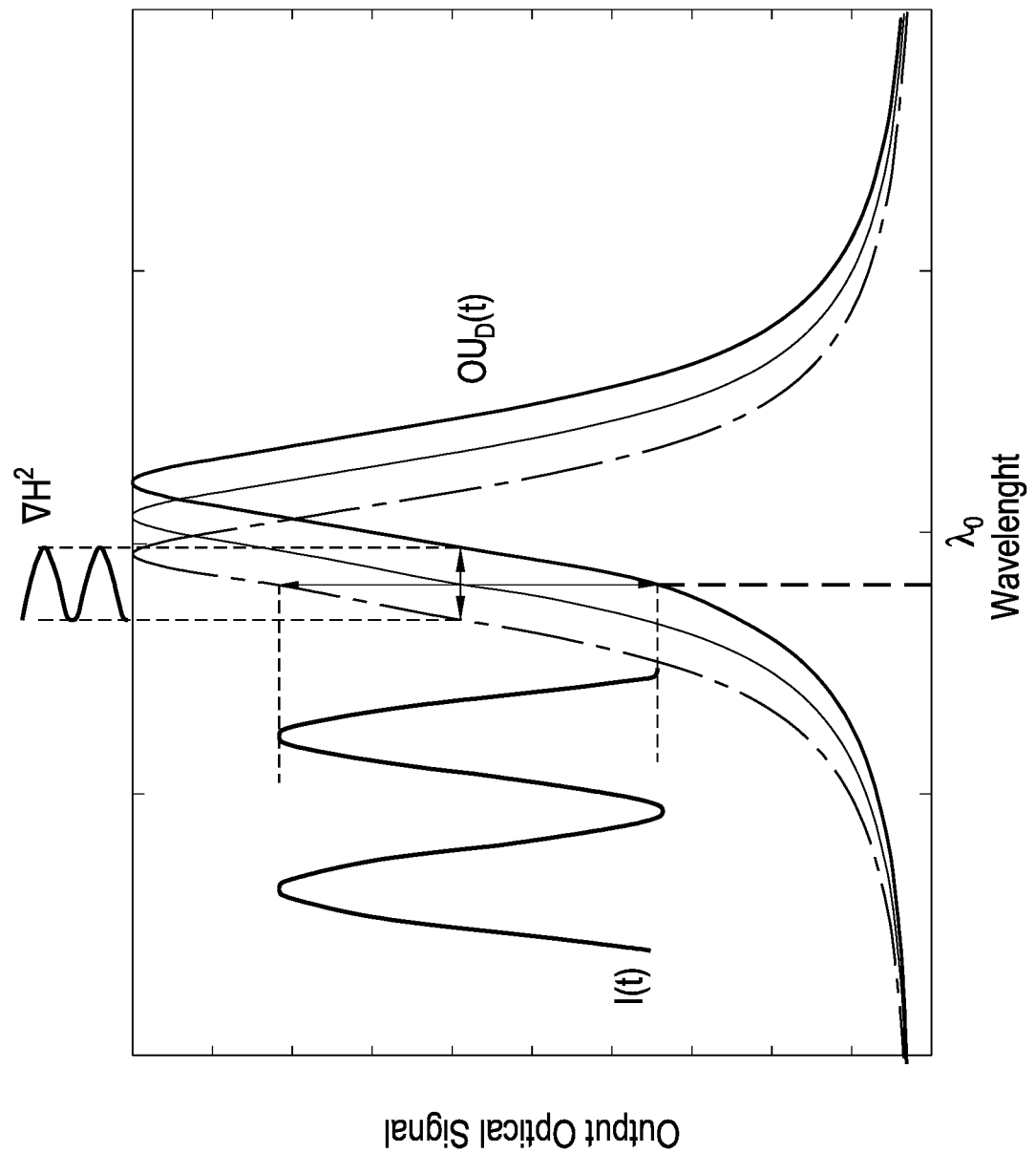

During the operation of the optical sensor device 100 of FIG. 5, an optical radiation with a wavelength proximate to the one of the resonance one $\lambda_0$ of the integrated optical microresonator 109 is injected, and particularly at the maximum slope point of the transmission function. Therefore, an oscillating magnetic field generated by the electromagnet 108 is applied, causing a movement of the magnetic particles 107, as already described, with an associated variation of the effective refraction index of the microresonator 109, in order to also modify the resonance conditions. This causes a modulation of the intensity of the optical radiation at the outputs OU and $OU_D$. FIG. 7a refers to the trend of an electric signal obtained by sensing the optical radiation at the output OU of the optical circuit 101, as the applied magnetic field varies: the amount of the variation of the electric signal is a function of the time trend of the force acting on the magnetic particle 107, proportional to the gradient of the square of the magnetic field, $\nabla H^2$. In the same way, a complementary signal is obtained by sensing the radiation present at the additional output $OU_D$, as shown in FIG. 7b.

If the transmission as a function of the wavelength is assumed linear about the considered work point (this is a small-signal approximation which does not jeopardize the principle on which this invention is based), a shift $\Delta z$ of the magnetic particle 107 causes a resonance shift equal to $\Delta \lambda$ and therefore an intensity modulation $I(\lambda)$ transmitted to the output OU and to the additional output $OU_D$, expressible as:

$$\Delta I(\lambda) = I(\lambda + \Delta \lambda) - I(\lambda) = I'(\lambda) \Delta \lambda$$

wherein:

$I(\lambda)$ is the optical intensity transmitted at the output OU or $OU_D$;

$\Delta I(\lambda)$ is the variation of the transmitted optical intensity;

$\Delta \lambda$ is the shift of the resonance;

$I'(\lambda)$ is the first derivative of the optical intensity.

From the above written expression it is evident that the trend of an electric signal, obtained by the opto-electric conversion of the radiation transmitted by the optical circuit 101, is maximized at the most sloping point of the transmission curve shown in FIG. 7a, at the side of the resonance.

For the superparamagnetic-type magnetic particles 107, whose force oscillates at a frequency twice the one of the magnetic field H, the electric signal obtained by the opto-electric conversion of the radiation outputs by the optical circuit 101, has a frequency equal to $2f_0$, wherein $f_0$ is the oscillation frequency of the magnetic field.

According to a particular embodiment practical example of the optical circuits 101 in FIGS. 1 and 5, the following illustrative dimensional values are given:

the guiding layer 104 has a thickness t=300 nm and is made by the silicon photonics technology;

the electromagnet 108 has a radius R=0.5 cm and an axial length L=2.2 cm;

the electromagnet 108 is placed at a distance δ=6 from the substrate 103 and is capable of generating a magnetic field of intensity H=0,625 A/m and gradient $H^2$ equal to $2 \times 10^9 A^2/m^3$ the magnetic particle 107, chemically bound to the analyte in turn bound to the probe particles 105, is at a distance $Z_0$=20-100 nm from the surface of the area 102 of the guiding layer 104.

Figure 8:
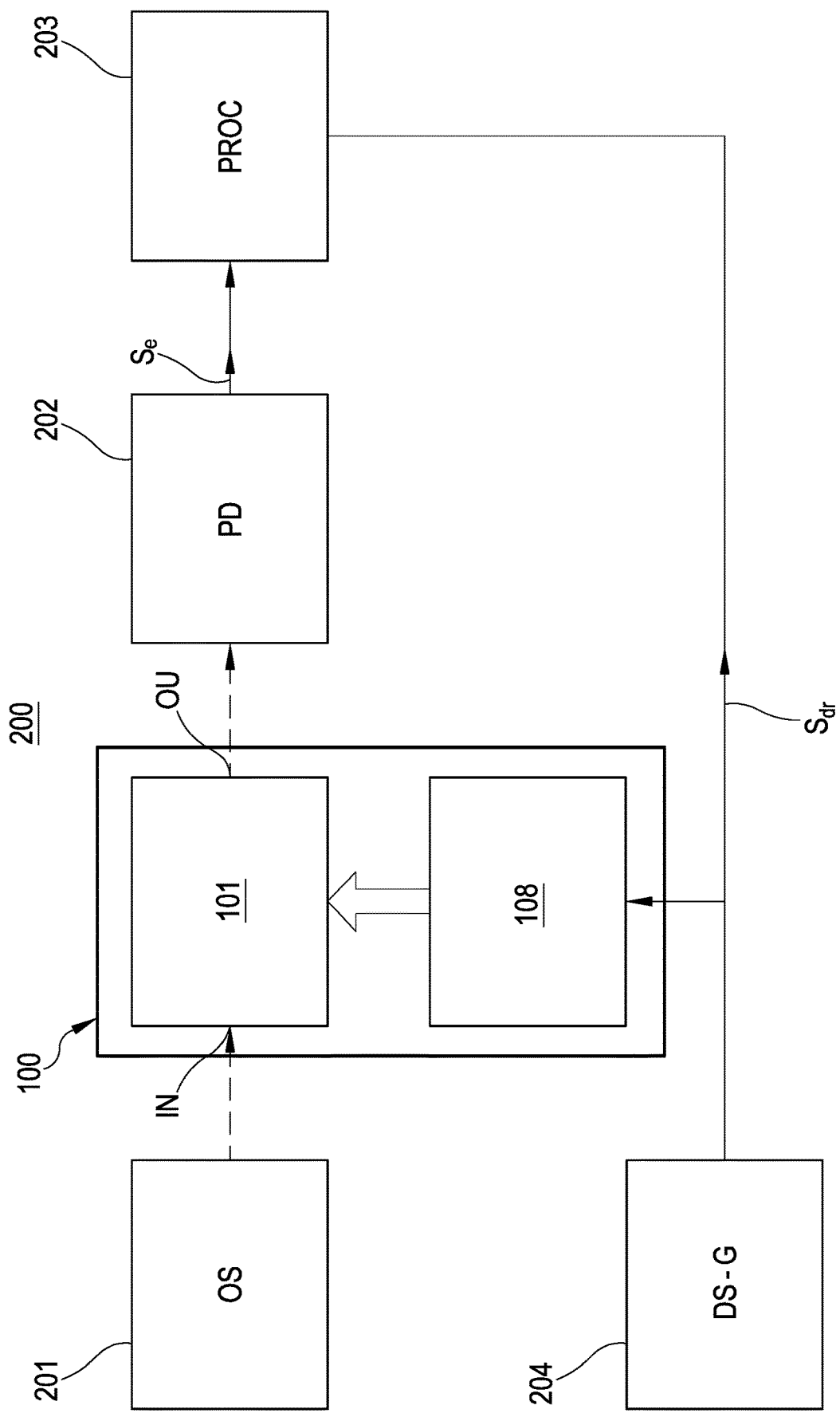
FIG. 8 shows an example of a molecular recognition system using said optical sensor.

FIG. 8 refers to a particular example of a molecular recognition system 200 comprising: an optical radiation source 201 (OS), the optical sensor device 100, an opto-electric conversion module 202 (PD), and a processing electronic apparatus 203 (PROC).

The optical radiation source 201 can be, for example, a tunable laser having an output port coupled (e.g. by an optical fiber or by suitable lenses) to the inlet IN of the optical circuit 101. The optical radiation source 201 is capable of generating a continuous radiation at the wavelength at which the guiding layer 104 is transparent to the radiation itself. Typically, the used wavelengths are the telecommunications ones (from 1500 to 1600 nm and from 1200 to 1400 nm), the near infra-red (750, 850, 980 nm), medium infra-red (from 2 to 8 microns), and the visible range (from 400 to 650 nm).

As it is well known to the persons skilled in the field, the photodetector and/or the laser source can be directly integrated on the chip by using technologies such as indium phosphide for photodiodes and lasers, the germanium or silicon/germanium for the photodiodes, hybridally or monolithically added to the integrated optical sensor device 100.

The optical sensor device 100 can be one of the devices beforehand described with reference to Figures from 1 to 7. Moreover, the recognition system 200 comprises a pilot signal generator 204 (DS-G) such to generate a pilot electrical signal Sdr (preferably a sinusoidal voltage and/or current signals) destined to supply the magnetic actuator 108. According to an embodiment example, the pilot electric signal has a peak-to-peak voltage comprised between 0 and 5 Vpp and a frequency to 100 Hz.

The magnetic actuator 108 can comprise an electromagnet in which a current of 0-2 A flows, for example, to which a magnetic field of intensity 0-5 mT corresponds, which supplies the optical circuit 101, at a distance σ.

The opto-electric conversion module 202 can comprise at least one photodiode and has an input optically coupled to the output OU and/or to the additional output $OU_D$ of the optical circuit 101 and an output for an electric signal SE, proportional to the intensity of the output optical radiation, to be supplied to the processing electronic apparatus 203.

The electronic processing apparatus 203 is capable of receiving the electric signal Se and from which, calculating data regarding the concentration in the analyzed sample of the molecules 106 of the analyte.

By considering the case in which the electric signal Se represents an intensity modulation of the optical radiation as described with reference to Figures from 5 to 7 (by the microresonators 109), the electronic processing apparatus 203 can be selected for performing a coherent demodulation of the electric signal Se. For example, such processing apparatus includes a lock-in demodulator capable of extracting the amplitude of the modulated electric signal Se.

The operation of the molecular recognition system 200 is based on the operation of the optical sensor device 100, as described. In summary, the generation of the optical radiation is provided by the source 201 coupled to the optical circuit 101 and the variable magnetic field is generated by the magnetic actuator 108, commanded by the pilot electric signal Sdr. The low-frequency (preferably from 10 Hz to 100 Hz, or more broadly from 1 Hz to 1 kHz) variable magnetic field generates the oscillating motion of the magnetic particles 107 anchored to the surface of the area 102 of the circuit 101 by one or more probe molecules 105, which causes a variation of the intensity of the optical radiation transmitted at the output OU and/or $OU_D$, at the same excitation frequency or at a double frequency.

Specifically, it is observed that the optical radiations at outputs OU and/or $OU_D$ are converted in one or more electric signals Se having an amplitude function of several experimental parameters, among which:

(i) the wavelength $\lambda_0$ of the incident optical radiation,
(ii) the amplitude of the oscillating magnetic field H,
(iii) the distance of the electromagnet 108 from the optical circuit 101, which determines the entity of the gradient ΔH of the magnetic field,
(iv) the length and the rigidity of the probe-analyte complex,
(v) the number of magnetic particles 107 bound to the surface of the area 102 and oscillated by the magnetic field H,
(vi) the optical characteristics of the resonator 109 (the width and depth of the resonant peak).

All the parameters (in other words the above listed ones) being equal it is possible to establish a relationship between the number of magnetic particles 107 bound to the area 102 of the microresonator 109, in turn function of the molecular recognition events on said area, and the entity of the electric signal Se at the output. This is the physical principle for quantifying the concentration of an analyte in the used sample, by comparing a suitable calibration curve, beforehand measured, in response to samples having titrated concentrations of the analyte.

The electric signal Se, supplied by an opto-electric conversion module 202, is demodulated at the frequency $2f_0$ by the electronic processing circuit 203, such as a lock-in amplifier, using, as a reference, the pilot signal Sdr at the input of the electromagnet 108.

By the amplitude of the electric signal Se, obtained by a demodulation, a computing module (for example included in the processing electronic device 203) determines the concentration in the analyzed sample of the molecule 106 of the analyte, by a comparison with a suitable calibration curve.

It is observed that calibration steps made on known samples, enabling to determine a calibration curve for each considered specific analyte, are performed before using the optical sensor device 100 and recognition system 200.

Due to the times required to measure the concentration of the analyte, it is observed that the sensor optical device 100 and recognition system 200 enable to quantify the molecular recognition events at the surface of the sensor optical device 100 in a particularly short time. For example, it is sufficient to acquire signals in an interval of few tens of seconds. This can be performed in a step following the probe-analyte hybridization step, without requiring to continuously monitor the signal which can cause the risk of errors generated by spurious fluctuations. On the other hand, the short quantifying time is independent from the time required for the molecular recognition between the probe and the analyte which is dictated by the association and dissociation constants of the complex.

According to a particular embodiment, the optical sensor device 100 enables to implement a kind of "magnetic color" for the magnetic particles 107. More particularly, using pairs of magnetic particles 107 and probe molecules 105 having suitable dimensions, shape and mechanical properties, it is possible to have on a same area sensible to the optical circuit 101, magnetic nanoparticles having a different frequency response to the magnetic fields. Measuring the signal modulation at different frequencies makes consequently possible to obtain the concentrations of different anlytes on the optical sensor device 100 itself.

This enables to reliably quantify relative concentrations also in case of a competitive molecular recognition, without the problem of the different sensibility of nominally identical sensors on which it is possible to simultaneously measure different analytes.

With reference to the examples of the optical circuit 101, beforehand described, it is observed that this latter can comprise, in addition, or as a substitution, at least one of the following integrated optical devices: any interferometers (a Fabry-Perot interferometer, a resonant ring interferometer, a Mach-Zehnder interferometer, a Sagnac interferometer, an all-pass type Gires-Tournois interferometer, a Michelson interferometer, a diffraction grating, a Bragg grating, an apparatus exploiting the Surface Plasmon Resonance (SPR), the Localized Surface Plasmon resonance (LSPR) or the Surface Enhanced Raman Spectroscopy (SERS). The electric signal Se will have a trend function of the characteristic parameter of the optical radiation correlated to a concentration of the molecules 106 of the analyte in the sample.

EXPERIMENTAL RESULTS

The Applicant has made a prototype of the optical sensor device 100 by using optical microresonators 109 by which double DNA helixes, of 60 bases (about 20 nm) were immobilized, which expose a molecule of biotin. The immobilization step was performed by different concentrations of DNA, for evaluating the dependency of the sensed signal from the concentration of the immobilized molecules, simulating the results of a real molecular recognition experiment.

Then, a solution of magnetic nanoparticles Micromod®Nanomag®-D having a diameter of 250 nm and coated by streptavidin, was dispensed on the surface of the area 102 of the optical sensor device 100. Due to the strong chemical affinity between biotin and streptavidin, the magnetic nanoparticles 107 bind to the surface thanks to the concentration of the immobilized double helixes. The unbound surplus magnetic particles 107 were removed by suitably washing them in PBS, and the optical sensor device 100 is positioned on a sample-holder of the measure station, by always maintaining the particles in a wet environment for maintaining their stability.

The rigidity of the double helix, having a length less than the typical persistence length of DNA, does not enable substantial elongations or inflections, but a DNA rotation with respect to the anchoring point, which causes a net shift of the particles in a direction perpendicular to the surface of the optical sensor device 100.

For a magnetic field H on the surface of the optical circuit 101 with a maximum amplitude of 0.6 A/m and $\nabla H^2$ equal to $2 \times 10^9$ $A^2/m^3$, and a sinusoidal modulation of 10 Hz, at a DNA concentration of 1 µM used for the immobilization on the optical circuit 101, it is obtained a percentage modulation of the intensity at the output at frequency $2f_0$ equal to about 0.7%, as shown in FIG. 9.

As can be seen in FIG. 9, the electric signal is only present under ON conditions of the magnetic field H ("H on"), while it is null without the magnetic field ("H off"). This is an important result, because the quantification does not require a time acquisition of all the dynamics of the molecular recognition.

The signal/noise ratio for the signal in FIG. 9, evaluated as a ratio between the average value of the signal in the presence of an oscillating magnetic field and the variance of the signal in the H-off condition is greater than 200. Such value was obtained from a DNA concentration equal to 1 µM used for the immobilization, however other not shown data indicate that it is possible to obtain detection limits (LOD) in the order of pM.

The described approach is particularly advantageous because the used sensing technique, based on magnetic particles bound to the analyte and probe molecules and based on the use of a variable magnetic field, enables to have a high variation of the local refraction index, entailing the availability of an optical signal by which the impact of the spurious fluctuations is reduced, substantially increasing the signal/noise ratio. Moreover, the quantification according to the described technique is performed within tens of seconds, without requiring to continuously record the signal during the molecular recognition, which typically requires few tens of minutes for obtaining a saturation.

Specifically, it is observed that the optical sensor device 100 and system 200 enable to asynchronously measure the analyte with respect to a molecular recognition reaction which leads to the bonds with the analyte, provided that the stability of the particles and bonds between it and the optical circuit surface is ensured. This enables to substantially relax the stability requirements of the different measure parameters (temperature, optical coupling, etcetera) with respect to the standard techniques using optical devices such as microresonators, without a magnetic particle-induced modulation.

In an embodiment of the present invention it is also possible to demodulate the differential signal obtained by electrically subtracting the outputs OU and $OU_D$ in order to cancel the common mode noises or without requiring possible normalizations of the signal itself. In this case, the electronic processing apparatus 203 is configured to demodulate the differential signal obtained by the subtraction (e.g., between electric signals obtained by corresponding opto-electronic converters) of the radiation at the output OU and at the additional output $OU_D$, or by other analogous normalization forms.

The invention claimed is:

1. An Opto-magnetic device sensible to the presence of an analyte in a sample, comprising:
    an integrated optical circuit having an input (IN) for an input optical radiation and at least one output (OU; $OU_D$) for an output optical radiation, wherein said optical circuit defines an area sensible to the variations of a local refraction index probed by the optical radiation, to come in contact with the sample, the area being defined as a sensible area;
    a plurality of probe molecules to anchor to at least said sensible area;
    a plurality of magnetic particles to anchor to molecules of the analyte, bound to the probe molecules upon a molecular recognition;
    a magnetic actuator configured to generate a variable magnetic field according to a first frequency and move in oscillating way said magnetic particles according to a second frequency bound to the molecules of the analyte which are bound to the probe molecules anchored to at least said sensible area in order to cause a variation of the refraction index probed by the optical radiation in the sensible area and a variation of intensity of the output optical radiation correlated to a concentration of the molecules of the analyte in the sample, wherein said magnetic particles are superparamagnetic particles, wherein the magnetic actuator comprises an electromagnet;

wherein said first frequency is comprised between 1 Hz and 1 kHz; and wherein the magnetic actuator is configured to cause a modulation of the intensity of the output optical radiation at the second frequency that is double the first frequency.

2. The optical device according to claim 1, wherein the intensity is modulable as a consequence of a variation of the refraction index probed by the optical radiation in the sensible area of the optical circuit.

3. The optical device according to claim 1, wherein said integrated optical circuit comprises at least one integrated optical waveguide configured to receive the input optical radiation and transmit the output optical radiation.

4. The optical device according to claim 2 wherein:
the integrated optical circuit comprises at least one microresonator configured to define the sensible area; said at least one microresonator being associated with a resonance frequency which is a function of a distance of said magnetic particles from the sensible area;
the magnetic actuator is configured to generate an oscillating force on the magnetic particles anchored to the sensible area, upon the molecular recognition between the probe molecules and the analyte molecules, with a consequent oscillation of the refraction index probed by the optical radiation such as to cause a modulation of the intensity of the output optical radiation.

5. The optical device according to claim 1, wherein the magnetic actuator is configured to generate an oscillating magnetic field causing a modulation of the intensity of the output optical radiation at the second frequency, when the frequency of the optical radiation injected in the optical circuit is close to the resonance frequency of the microresonator.

6. The optical device according to claim 1, wherein said frequency of the optical radiation injected in the optical circuit is close to the resonance frequency of the microresonator at the maximum of the slope of a transmission function microresonator.

7. The optical device according to claim 1, wherein said optical circuit is made according to one of the following technologies: silicon photonics, silicon nitride, silicon oxynitride, indium phosphide, chalcogenides.

8. The optical device according to claim 1, wherein said optical circuit comprises one of the following integrated optical devices: an interferometer, a Fabry-Perot interferometer, a resonant ring interferometer, a Mach-Zehnder interferometer, a Sagnac interferometer, an all-pass type Gires-Tournois interferometer, a Michelson interferometer, a diffraction grating, a Bragg grating, an apparatus exploiting the Surface Plasmon Resonance (SPR), the Localized Surface Plasmon resonance (LSPR) or the Surface Enhanced Raman Spectroscopy (SERS).

9. A recognition system of an analyte of a sample comprising:

an optical radiation source configured to generate an input radiation;

an opto-magnetic device sensible to the presence of the analyte in the sample, comprising:
an integrated optical circuit having an input (IN) for an input optical radiation and at least one output (OU; $OU_D$) for an output optical radiation; said integrated optical circuit defining an area sensible to the variations of a local refraction index probed by the optical radiation, to come in contact with the sample;
a plurality of probe molecules such to anchor to at least said sensible area;
a plurality of magnetic particles such to anchor to molecules of the analyte, bound to the probe molecules upon a molecular recognition;
a magnetic actuator configured to generate a variable magnetic field according to a first frequency and move in oscillating way said magnetic particles according to a second frequency bound to the molecules of the analyte which are bound to the probe molecules anchored to said sensible area in order to cause a variation of the refraction index probed by the optical radiation in the sensible area and a variation of intensity of the output optical radiation correlated to a concentration of the molecules of the analyte in the sample,
wherein said magnetic particles are superparamagnetic particles:
wherein the magnetic actuator comprises an electromagnet;
wherein said first frequency is comprised between 1 Hz and 1 kHz; and
wherein the magnetic actuator is configured to cause a modulation of the intensity of the output optical radiation at the second frequency double the first frequency;

an optical-electric conversion module configured to convert the output optical radiation into an electric signal (Se) proportional to said intensity of the optical radiation; and an electronic processing apparatus connected to said optical-electric conversion module and configured to process the electric signal and determining the concentration of the molecules of the analyte.

10. The recognition system according to claim 9, wherein the magnetic actuator is configured to generate a variable magnetic field at the first frequency comprised between 10 Hz and 100 Hz.

11. The recognition system according to claim 9, wherein:
said intensity is modulable as a consequence of a variation of the refraction index probed by the optical radiation in the sensible area of the optical circuit;
said integrated optical circuit comprises:
at least one integrated optical waveguide configured to receive the input optical radiation and transmitting the output optical radiation, and
at least one microresonator configured to define the sensible area: said at least microresonator being associated with a resonance frequency which is function of a distance of said magnetic particles from the sensible area;
wherein the magnetic actuator is configured to generate an oscillating force on the magnetic particles anchored to the sensible area, upon the molecular recognition between the probe molecules and the analyte molecules, with a consequent oscillation of the refraction index probed by the optical radiation such as to cause a modulation of the intensity of the output optical radiation; and wherein the electronic processing apparatus is configured to perform an amplitude demodulation of the electric signal at the second frequency.

12. The recognition system according to claim 10, wherein:

said electromagnet comprises an electric conductor and a magnetic core; and the recognition system further comprises a pilot signal generator configured to supply a pilot electric signal (Sdr) to the electric conductor, having a sinusoidal trend.

13. The recognition system according to claim 9, wherein:

the optical-electric conversion module comprises at least one photodiode; and said optical radiation source comprises a laser.

14. The recognition system according to claim 9, wherein at least one of the optical-electric conversion module and said optical radiation source are integrated on an optical chip, on which said optical sensor device is integrated.

15. The recognition system according to claim 12, wherein:

the integrated optical circuit is provided with a further output ($OU_D$) for an output optical radiation complementary to said output optical radiation (OU);

the optical-electric conversion module is configured to convert the complementary output optical radiation into a further electric signal;

the electronic processing apparatus is configured to perform a demodulation of a differential signal obtained by a difference between the electric signal and the further electric signal.

* * * * *